US011175871B2

United States Patent
Kurosawa

(10) Patent No.: US 11,175,871 B2
(45) Date of Patent: Nov. 16, 2021

(54) IMAGE FORMING APPARATUS, NON-TRANSITORY COMPUTER READABLE MEDIUM, AND IMAGE FORMING SYSTEM FOR RECEIPT OF PRINT DATA INCLUDING PRINT SETTINGS

(71) Applicant: FUJIFILM BUSINESS INNOVATION CORP., Tokyo (JP)

(72) Inventor: Asuka Kurosawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/554,809

(22) Filed: Aug. 29, 2019

(65) Prior Publication Data

US 2020/0301636 A1 Sep. 24, 2020

(30) Foreign Application Priority Data

Mar. 18, 2019 (JP) .............................. JP2019-049541

(51) Int. Cl.
*G06F 3/12* (2006.01)

(52) U.S. Cl.
CPC .......... *G06F 3/1261* (2013.01); *G06F 3/1204* (2013.01); *G06F 3/1254* (2013.01); *G06F 3/1258* (2013.01); *G06F 3/1288* (2013.01)

(58) Field of Classification Search
CPC .... G06F 3/1261; G06F 3/1204; G06F 3/1254; G06F 3/1258; G06F 3/1288; G06F 3/1205
See application file for complete search history.

(56) References Cited

U.S. PATENT DOCUMENTS

| | | | | |
|---|---|---|---|---|
| 2007/0019222 | A1* | 1/2007 | Oda | G06F 3/1204 358/1.13 |
| 2008/0297842 | A1* | 12/2008 | Asai | G06F 3/1257 358/1.15 |
| 2011/0273743 | A1* | 11/2011 | Nakahara | G06K 15/1811 358/1.15 |
| 2014/0240735 | A1* | 8/2014 | Salgado | G06F 3/1204 358/1.13 |
| 2017/0085730 | A1* | 3/2017 | Maeda | G06F 3/1285 |
| 2017/0228200 | A1* | 8/2017 | Kessels | G06F 3/126 |
| 2019/0286402 | A1* | 9/2019 | Shiohara | G06F 3/1211 |
| 2020/0089443 | A1* | 3/2020 | Kashiwagi | G06F 3/1205 |

FOREIGN PATENT DOCUMENTS

JP 5814904 B2 11/2015

* cited by examiner

*Primary Examiner* — Iriana Cruz
(74) *Attorney, Agent, or Firm* — Oliff PLC

(57) ABSTRACT

An image forming apparatus includes: a reception unit that receives a print job in which setting information indicating print settings for printing print data is incorporated as part of the print data, and a control unit that performs printing according to the print settings indicated by the setting information incorporated in the print data of the print job.

11 Claims, 11 Drawing Sheets

(IMAGE FORMING APPARATUS)

(USER TERMINAL)

(SERVER)

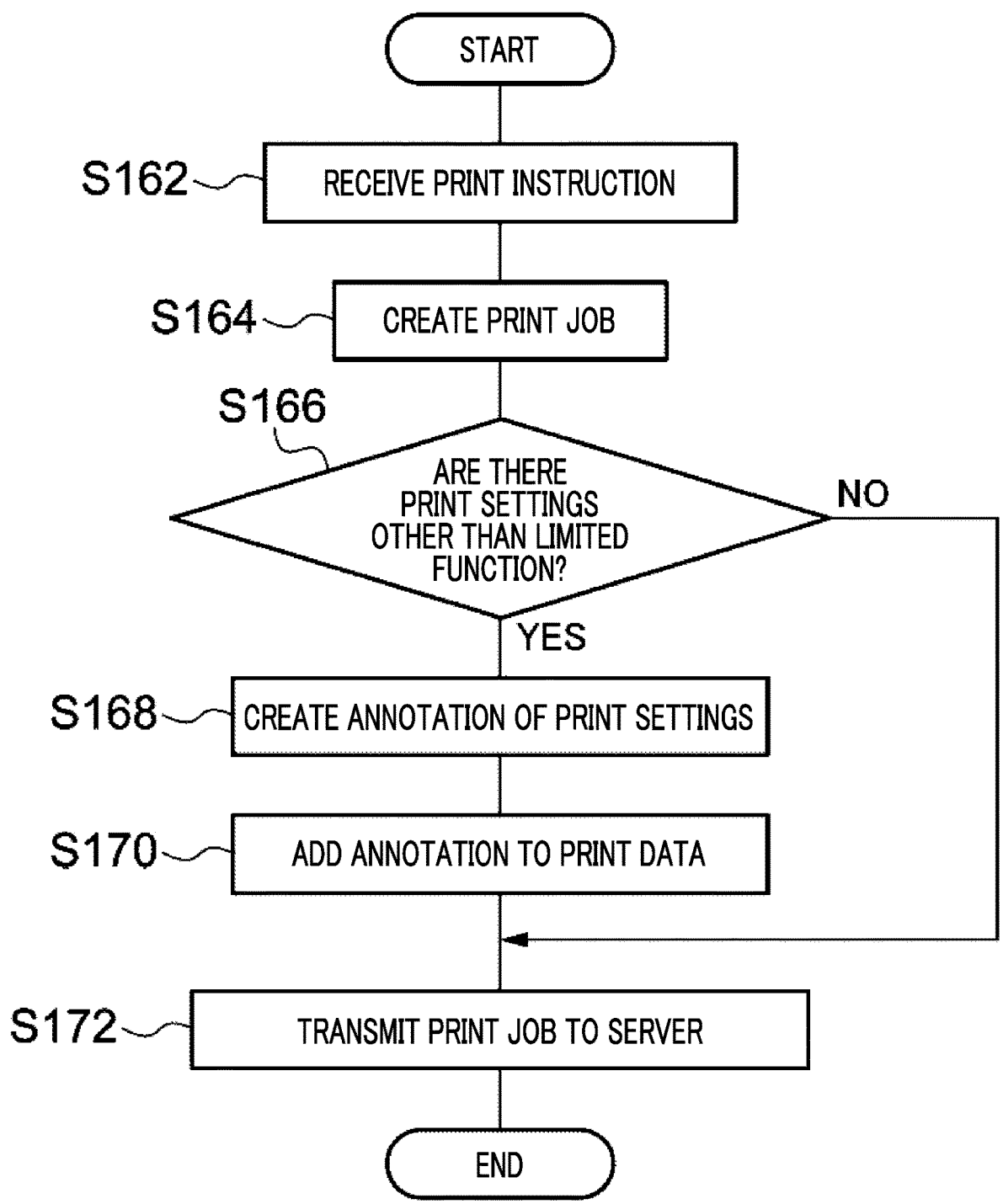

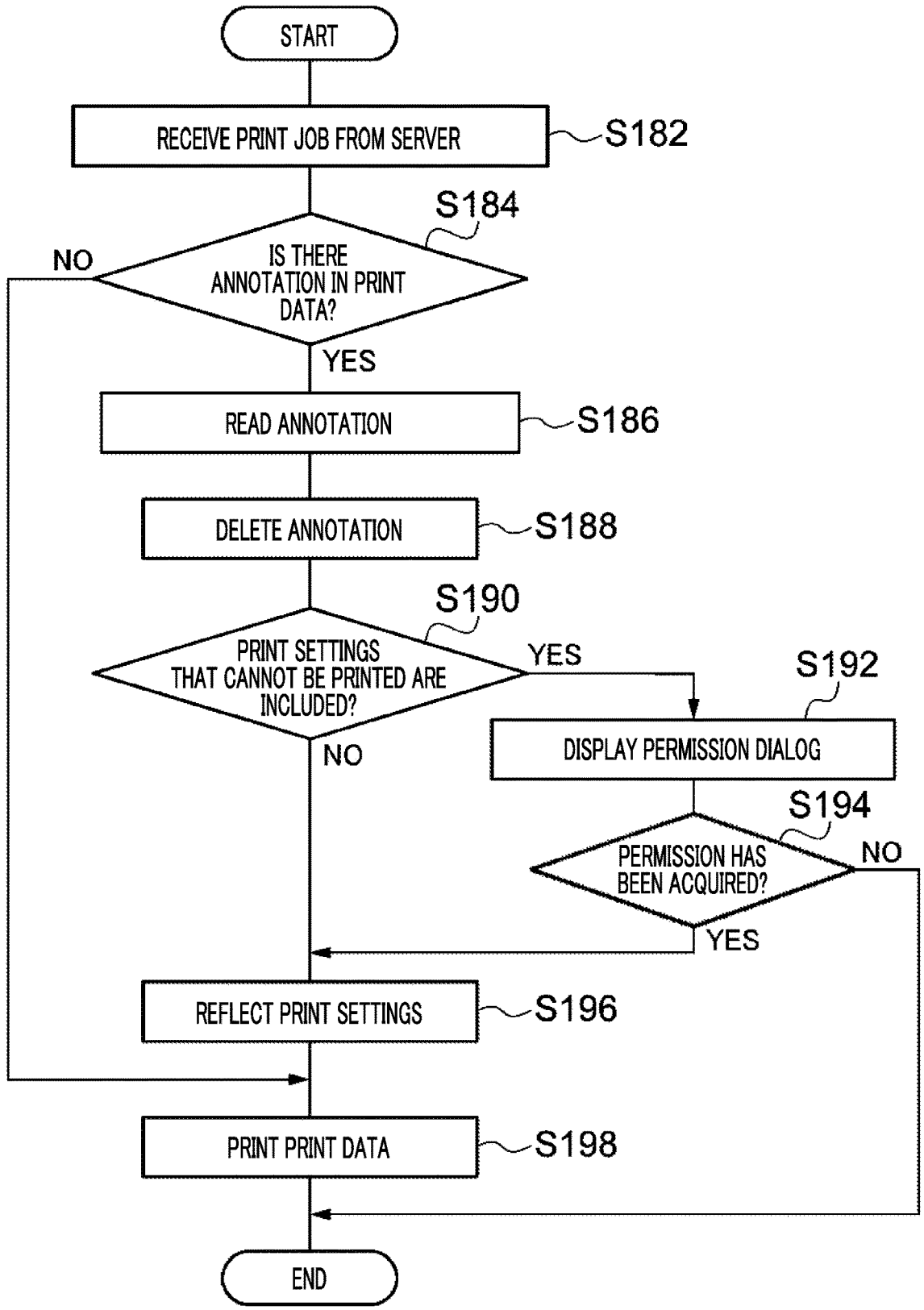

IMAGE FORMING APPARATUS, NON-TRANSITORY COMPUTER READABLE MEDIUM, AND IMAGE FORMING SYSTEM FOR RECEIPT OF PRINT DATA INCLUDING PRINT SETTINGS

CROSS-REFERENCE TO RELATED APPLICATIONS

This application is based on and claims priority under 35 USC 119 from Japanese Patent Application No. 2019-049541 filed Mar. 18, 2019.

BACKGROUND

(i) Technical Field

The present disclosure relates to an image forming apparatus, a non-transitory computer readable medium, and an image forming system.

(ii) Related Art

JP-B-5814904 discloses an image forming apparatus including a job acquisition unit that acquires a print job generated by an instruction from a client device through a network; a pre-conversion data acquisition unit that, in a case where the job acquisition unit acquires the print job from a server, acquires data to be printed before being generated as the print job, from the server; a data format determination unit that determines whether a data format of data to be processed in the print job acquired by the job acquisition unit matches a data format of the data to be printed acquired by the pre-conversion data acquisition unit; a print mode change unit that, in a case where the data format determination unit determines that the data formats do not match, switches a print processing mode of the print job acquired by the job acquisition unit to a hold print mode of holding the print job without executing, and executing printing in a case where an operation input for instructing print execution is performed; and an image formation processing control unit that in a case where the print mode change unit switches the print processing mode to the hold print method, in a case where the operation input for instructing print execution is performed, controls image formation processing based on the print job acquired by the job acquisition unit.

In recent years, there is a cloud service in which a server manages an image forming apparatus, relays a print job from a user terminal, and causes an image forming apparatus to print. In a case where plural image forming apparatuses are managed, the functions of the plural image forming apparatuses are not necessarily uniform. In such a case, the server receives a print job from the user terminal only for minimum functions executable by the image forming apparatus. In other words, the server does not relay a print job instructing functions not included in the limited functions to the image forming apparatus.

In this case, even when the image forming apparatus is managed to be able to execute the functions instructed by the print job, the print job cannot be transmitted to the image forming apparatus.

SUMMARY

Aspects of non-limiting embodiments of the present disclosure relate to providing an image forming apparatus which can execute printing based on a user's request to use functions not included in limited functions in a case where a relay unit is used to relay a print job.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an image forming apparatus including: a reception unit that receives a print job in which setting information indicating print settings for printing print data is incorporated as part of the print data; and a control unit that performs printing according to the print settings indicated by the setting information incorporated in the print data of the print job.

BRIEF DESCRIPTION OF THE DRAWINGS

Exemplary embodiments of the present invention will be described in detail based on the following figures, wherein:

FIG. 11 is a flowchart showing a flow of processing of the user terminal of the image forming system according to a second exemplary embodiment; and FIG. 12 is a flowchart showing a flow of an operation of the image forming apparatus of the image forming system according to the second exemplary embodiment.

DETAILED DESCRIPTION

Figure 1:
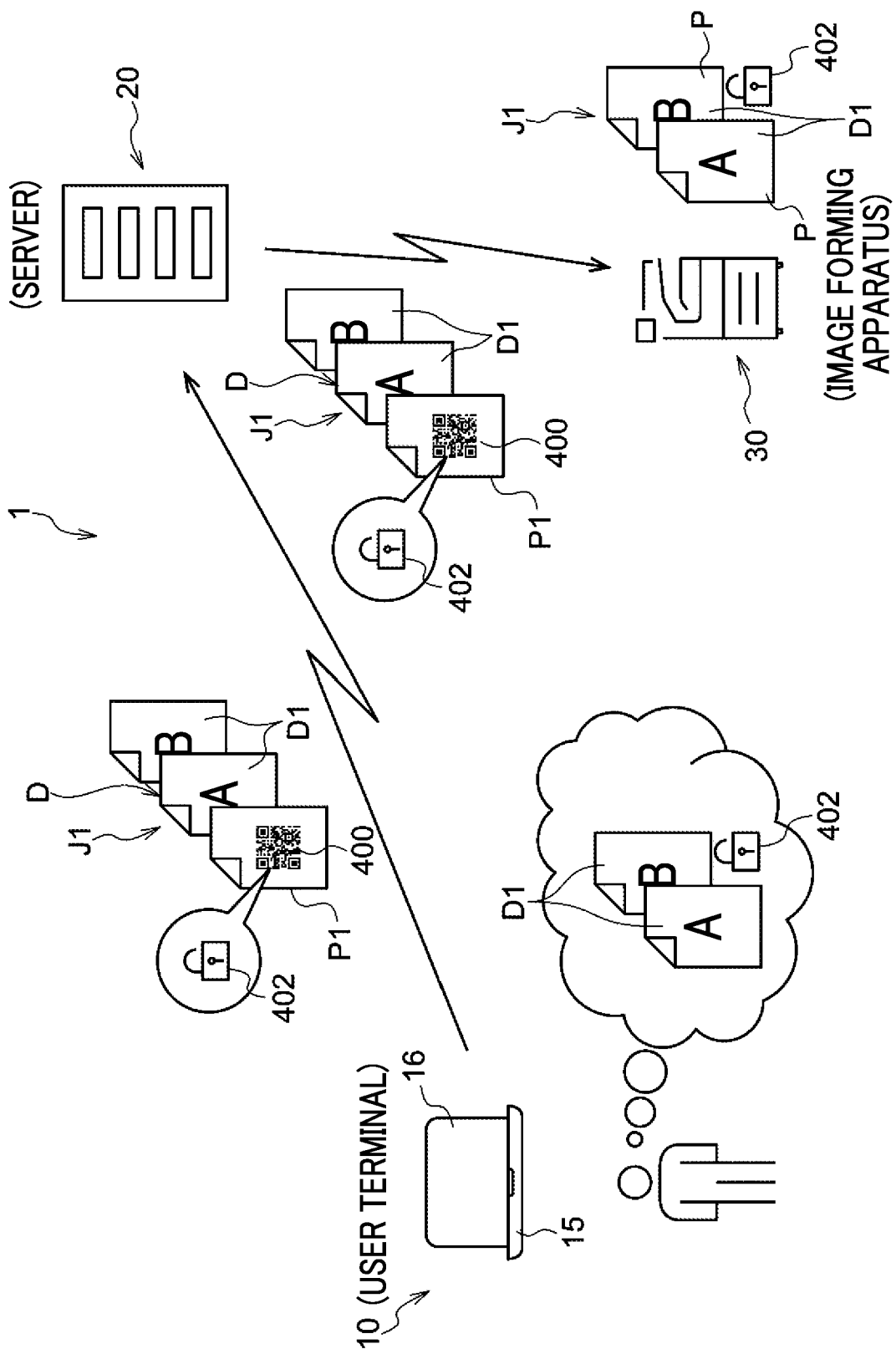
FIG. 1 is a diagram showing a schematic configuration of an image forming system according to a first exemplary embodiment.

Hereinafter, an exemplary embodiment of the present disclosure will be described in detail with reference to the accompanying drawings. In the drawings, the same or equivalent components and parts are denoted by the same reference numerals. Further, the dimensional proportions in the drawings are exaggerated for the convenience of the description, and may differ from the actual proportions.

First Exemplary Embodiment

FIG. 1 is a diagram showing a schematic configuration of an image forming system according to a first exemplary embodiment.

As shown in FIG. 1, the image forming system 1 includes a user terminal 10 as an example of a receiving unit, a server 20 as an example of a relay unit, and an image forming apparatus 30.

As an example, the image forming system 1 is a system in which a user terminal 10, an image forming apparatus 30 located in a different place from the user terminal 10, and a server 20 providing a service using a cloud are connected through the Internet, or a wired or wireless network. In FIG. 1, the image forming system 1 is illustrated as a system connected through a wireless network as an example.

The user terminal 10 is a device that creates and manages print data D1. The user terminal 10 has an input unit 15 and a display unit 16. In the user terminal 10, for example, the print data D1 is created by the input unit 15, and an image based on the print data D1 is displayed on the display unit 16.

In addition, the user terminal 10 incorporates, as part of the print data D, print settings for causing the image forming apparatus 30 to execute functions other than the "limited functions" to be described later which are managed by the server 20. The user terminal 10 transmits a print job J1 including the print data D to the server 20. The specific configuration and operation of the user terminal 10 will be described later.

The server 20 is a cloud server that provides a service using a cloud. The server 20 receives the print job J1 transmitted from the user terminal 10. Further, the server 20 transmits the print job J1 to the image forming apparatus 30. The specific configuration and operation of the server 20 will be described later.

The image forming apparatus 30 performs printing on a recording medium in accordance with an instruction from the user terminal 10. The image forming apparatus 30 receives the print job J1 transmitted from the server 20. Then, the image forming apparatus 30 reads the setting information of the print settings incorporated into the print data D of the print job J1, and prints the original print data D1 while reflecting the setting information of the print settings. The specific configuration and operation of the image forming apparatus 30 will be described later.

Figure 2:
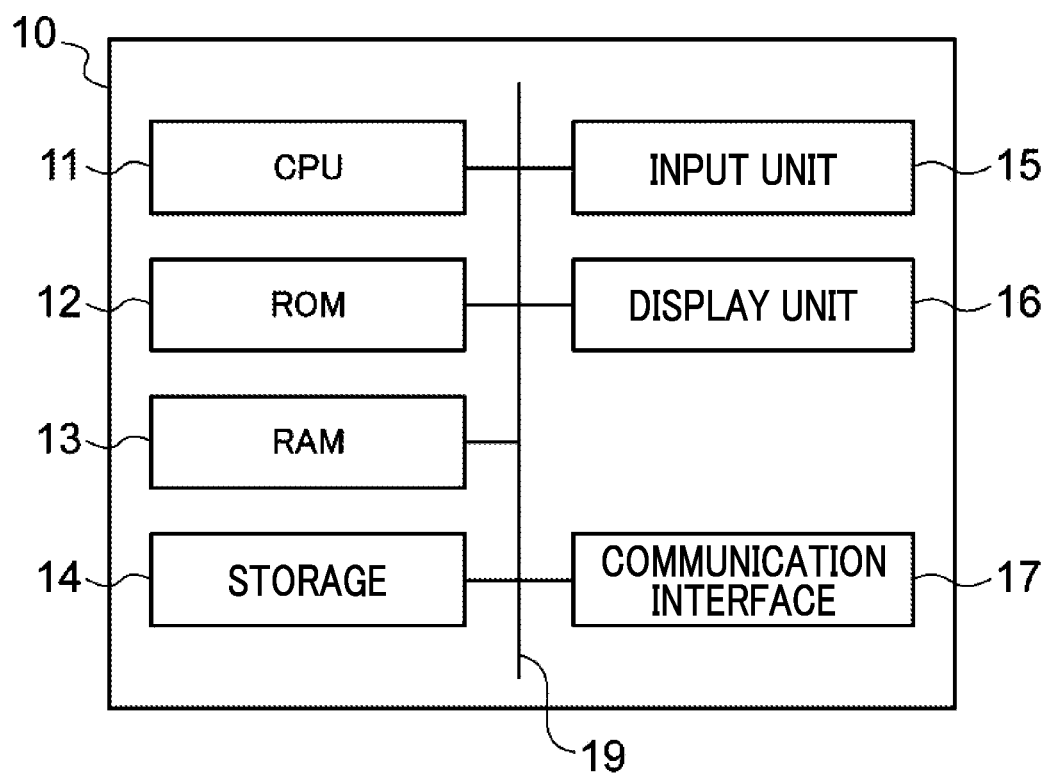
FIG. 2 is a block diagram illustrating a hardware configuration of a user terminal.

FIG. 2 is a block diagram illustrating a hardware configuration of the user terminal 10.

As shown in FIG. 2, the user terminal 10 has respective components of a central processing unit (CPU) 11, a read only memory (ROM) 12, a random access memory (RAM) 13, a storage 14, a communication interface 17, an input unit 15, and a display unit 16. The respective components are communicably connected to each other through a bus 19.

The CPU 11 is a central processing unit, and executes various programs or controls each part. That is, the CPU 11 reads a program from the ROM 12 or the storage 14, and executes the program using the RAM 13 as a work area. The CPU 11 controls the above-described components and performs various arithmetic processing in accordance with the program stored in the ROM 12 or the storage 14. In the present exemplary embodiment, the ROM 12 or the storage 14 stores a print setting addition program.

The ROM 12 stores various programs and various data. The RAM 13 as a work area temporarily stores a program or data. The storage 14 is a hard disk drive (HDD) or a solid state drive (SSD), and stores various programs including an operating system and various data. The storage 14 stores a printer driver program. The CPU 11 functions as a printer driver by reading the program of the printer driver from the storage 14 and executing the program.

The communication interface 17 is an interface for communicating with another device through the server 20 or the like, and for example, a standard such as Ethernet (registered trademark), FDDI, Wi-Fi (registered trademark) or the like is used.

The input unit 15 includes a pointing device such as a mouse and a keyboard, and is used to perform various inputs.

The display unit 16 is, for example, a liquid crystal display, and displays various types of information. The display unit 16 may function as the input unit 15 by adopting a touch panel method.

Figure 3:
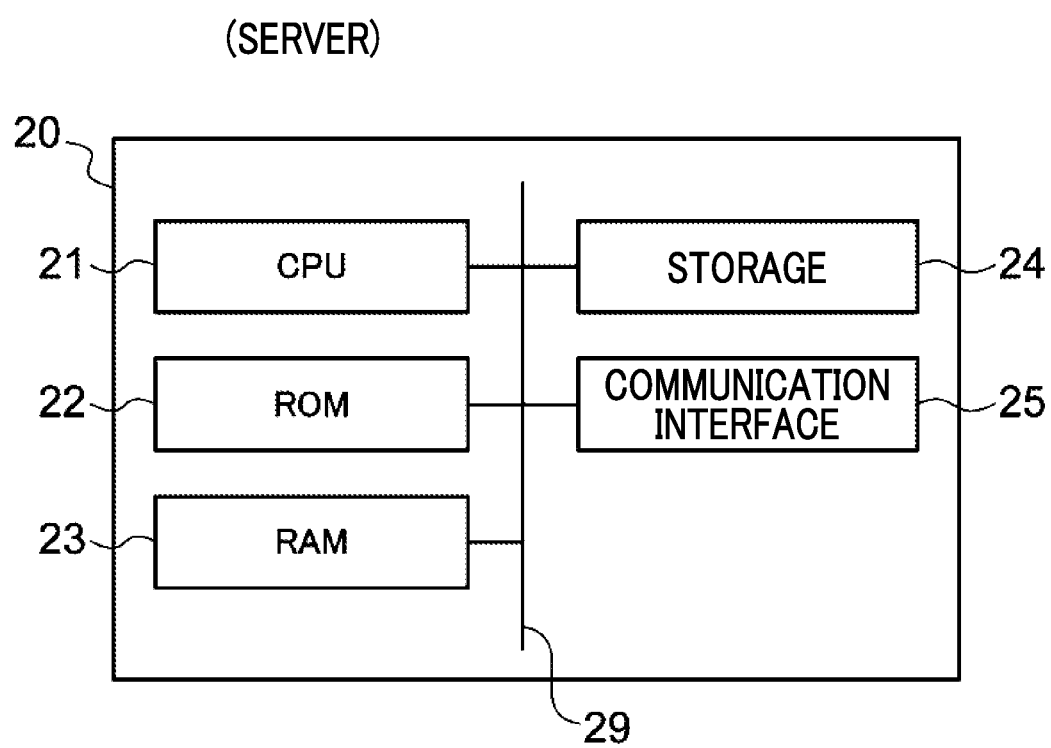
FIG. 3 is a block diagram showing a hardware configuration of a server.

FIG. 3 is a block diagram showing the hardware configuration of the server 20.

As shown in FIG. 3, the server 20 has respective components of a CPU 21, a ROM 22, a RAM 23, a storage 24, and a communication interface 25. The respective components are communicably connected to each other through a bus 29.

The CPU 21 is a central processing unit, and executes various programs or controls each part. That is, the CPU 21 reads a program from the ROM 22 or the storage 24, and executes the program using the RAM 23 as a work area. The CPU 21 controls the above-described components and performs various arithmetic processing in accordance with the program stored in the ROM 22 or the storage 24. In the present exemplary embodiment, the ROM 22 or the storage 24 stores a print job receiving program.

The ROM 22 stores various programs and various data. The RAM 23 as a work area temporarily stores a program or data. The storage 24 is a hard disk drive (HDD) or a solid state drive (SSD), and stores various programs including an operating system and various data.

The communication interface 25 is an interface for communicating with other devices such as the user terminal 10 and the image forming apparatus 30, and for example, a standard such as Ethernet (registered trademark), FDDI, Wi-Fi (registered trademark) or the like is used.

Figure 4:
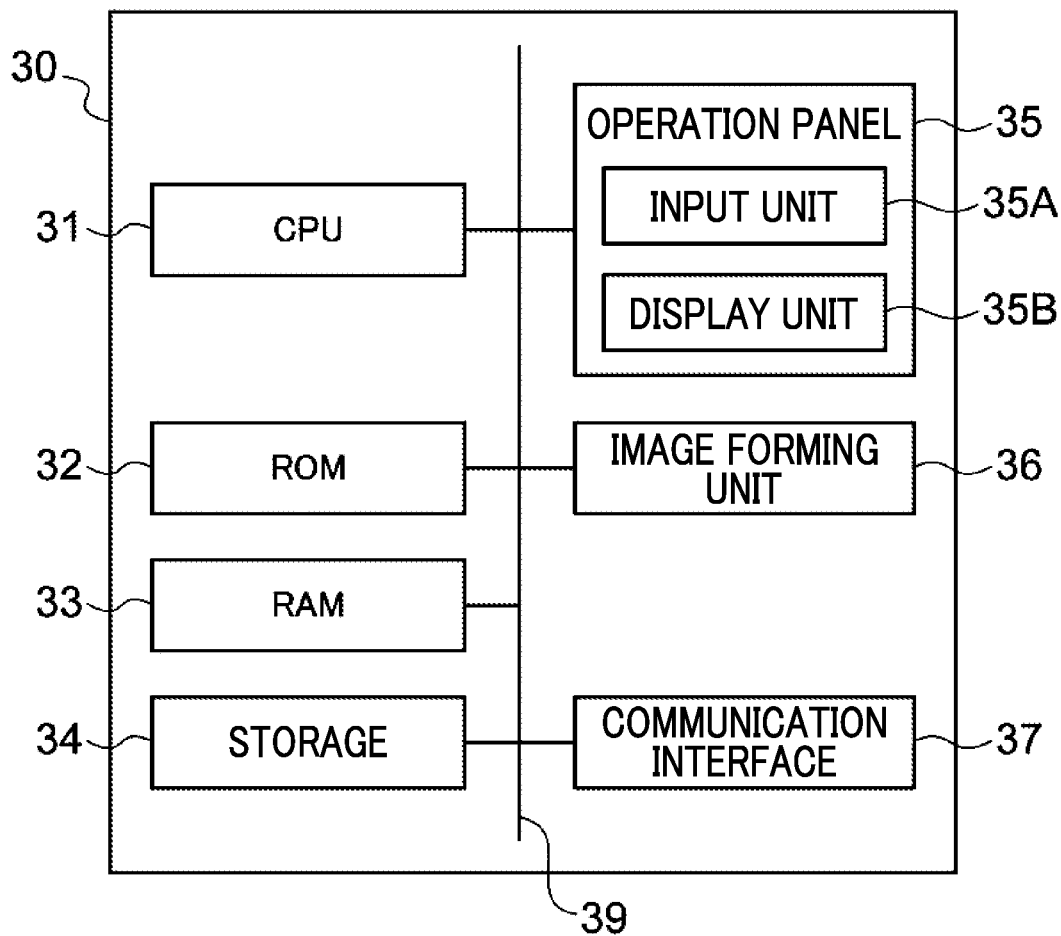
FIG. 4 is a block diagram showing a hardware configuration of an image forming apparatus.

FIG. 4 is a block diagram showing the hardware configuration of the image forming apparatus 30.

As shown in FIG. 4, the image forming apparatus 30 has respective components of a CPU 31, a ROM 32, a RAM 33, a storage 34, a communication interface 37, an image forming unit 36, and an operation panel 35. The respective components are communicably connected to each other through a bus 39.

The CPU 31 is a central processing unit, and executes various programs or controls each part. That is, the CPU 31 reads a program from the ROM 32 or the storage 34, and executes the program using the RAM 33 as a work area. The CPU 31 controls the above-described components and performs various arithmetic processing in accordance with the program stored in the ROM 32 or the storage 34. In the present exemplary embodiment, the ROM 32 or the storage 34 stores a print setting reflection program.

The ROM 32 stores various programs and various data. The RAM 33 as a work area temporarily stores a program or data. The storage 34 is a hard disk drive (HDD) or a solid state drive (SSD), and stores various programs including an operating system and various data.

The operation panel 35 has an input unit 35A and a display unit 35B. The display unit 35B is, for example, a liquid crystal display, and displays various types of information. The display unit 35B adopts a touch panel system, and a part of the display unit 35B functions as the input unit 35A.

The image forming unit 36 forms print data on the recording medium based on a print job J1. The image forming unit 36 forms print data on a recording medium by, for example, an electrophotographic method. The image forming unit 36 includes a process unit that forms a toner image, a transfer unit that transfers the toner image to the recording medium, and a fixing unit that fixes the toner image transferred to the recording medium to the recording medium. The image forming unit 36 may form print data on a recording medium by an inkjet method instead of the electrophotographic method.

The communication interface 37 is an interface for communicating with another device through the server 20 or the like, and for example, a standard such as Ethernet (registered trademark), FDDI, Wi-Fi (registered trademark) or the like is used.

Next, functional configurations of the user terminal 10, the server 20, and the image forming apparatus 30 will be described.

Figure 5:
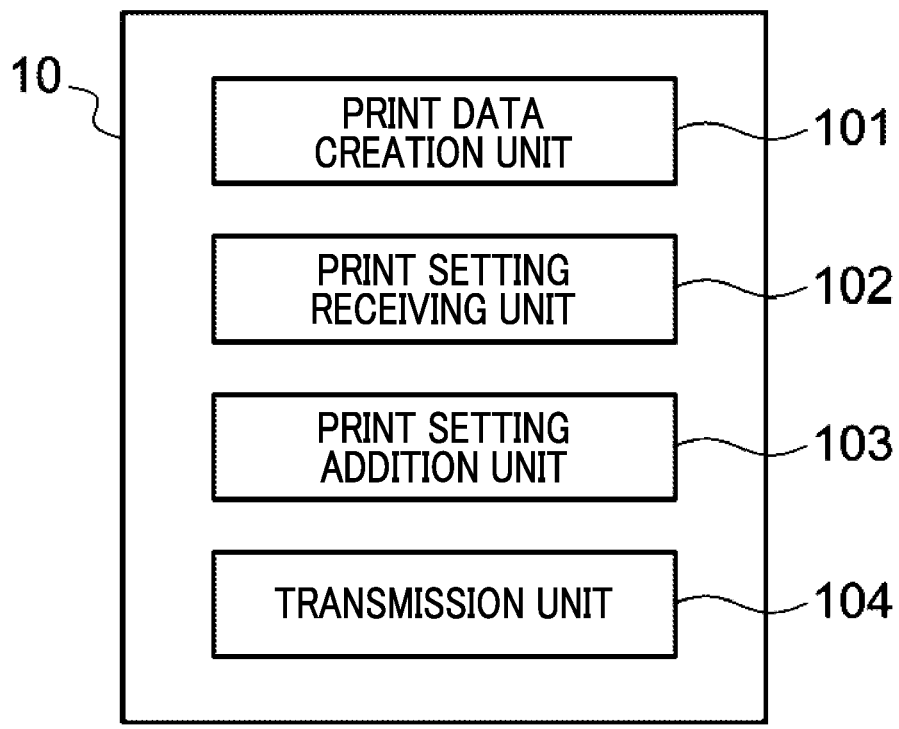
FIG. 5 is a block diagram showing an example of a functional configuration of the user terminal.

FIG. 5 is a block diagram showing an example of a functional configuration of the user terminal 10.

As shown in FIG. 5, the user terminal 10 has a print data creation unit 101, a print setting receiving unit 102, a print setting addition unit 103, and a transmission unit 104 as functional configuration. Each function is implemented by the CPU 11 reading out the print setting addition program stored in the ROM 12 or the storage 14, and developing and executing the program in the RAM 13.

The print data creation unit 101 creates print data D1 (see FIG. 1). The user may create the print data D1 by inputting data using the input unit 15 of the user terminal 10, or may create the print data D1 by using data received from another device by the communication interface 17 of the user terminal 10.

The print setting receiving unit 102 receives print settings for printing the print data D1 (see FIG. 1). The print settings include functions that can be executed by the image forming apparatus 30 and functions that are more limited than the functions that can be executed by the image forming apparatus 30 (hereinafter referred to as "limited functions"). The "limited functions" are functions defined by the server 20 as functions that the general-purpose image forming apparatus can execute at a minimum, and the function acquired from the server 20 is stored in the ROM 12 or the storage 14. Examples of functions that can be executed by the image forming apparatus 30 other than the "limited functions" include post-processing such as stapling, punching with a punch, authentication for permitting print processing only to specific users, or color printing.

The print setting addition unit 103 incorporates, as part of the print data D, print settings for causing the image forming apparatus 30 to execute functions other than the "limited functions". That is, the print data D includes the original print data D1 to be printed, and the setting information of the print settings for causing the image forming apparatus 30 to execute functions other than the "limited functions" (see FIG. 1). In the present exemplary embodiment, the print setting addition unit 103 creates a matrix two-dimensional code 400 as setting information indicating print settings, and adds the matrix two-dimensional code 400 to a page different from the print data D1 (in the present exemplary embodiment, the first page P1).

The transmission unit 104 transmits, to the server 20, the print job J1 including the print data D in which the print settings are incorporated. That is, the transmission unit 104 causes the server 20 to receive the print data D in which the print settings are incorporated, by regarding the print data D as the print job J1 instructing the above-described "limited functions".

Figure 6:
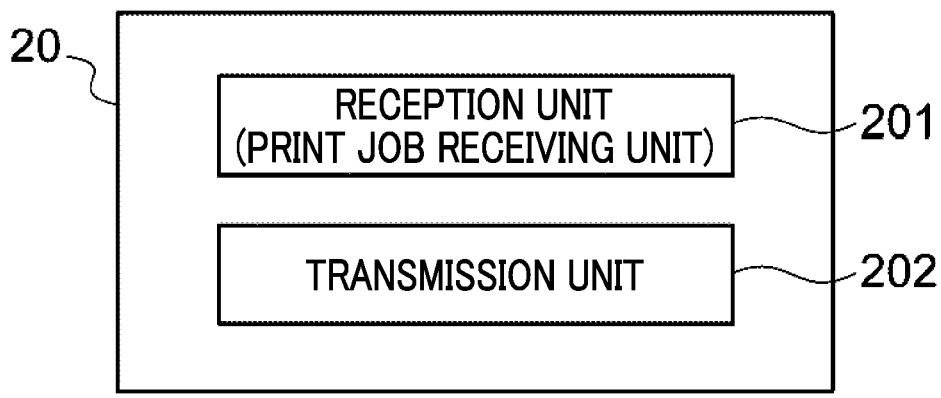
FIG. 6 is a block diagram showing an example of a functional configuration of the server.

FIG. 6 is a block diagram showing an example of a functional configuration of the server 20.

As illustrated in FIG. 6, the server 20 includes a reception unit 201 as an example of the print job receiving unit, and a transmission unit 202 as functional configuration. Each function is implemented by the CPU 21 reading out the print job receiving program stored in the ROM 22 or the storage 24, and developing and executing the program in the RAM 23.

The reception unit 201 receives the print job J1 (see FIG. 1) transmitted by the user terminal 10. The reception unit 201 accepts the print job J1 instructing the "limited functions", and does not accept the print job instructing functions other than the "limited functions". In the present exemplary embodiment, the transmission unit 104 of the user terminal 10 causes the reception unit 201 of the server 20 to receive the print job J1, by regarding the print data D in which the print settings are incorporated as the print job J1 instructing the above-described "limited functions".

The transmission unit 202 transmits the print job J1 received by the reception unit 201 to the image forming apparatus 30.

Figure 7:
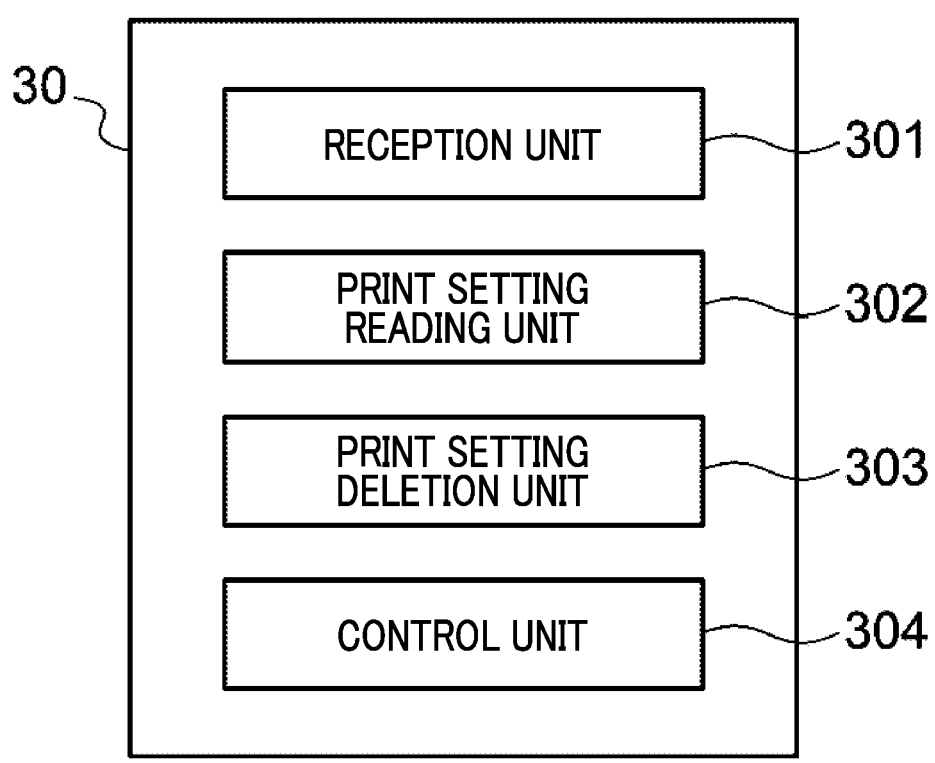
FIG. 7 is a block diagram showing an example of a functional configuration of the image forming apparatus.

FIG. 7 is a block diagram showing an example of the functional configuration of the image forming apparatus 30.

As illustrated in FIG. 7, the image forming apparatus 30 includes a reception unit 301, a print setting reading unit 302, a print setting deletion unit 303, and a control unit 304 as functional configuration. Each function is implemented by the CPU 31 reading out a print setting reflection program stored in the ROM 32 or the storage 34, and developing and executing the program in the RAM 33.

The reception unit 301 receives the print job J1 transmitted by the server 20.

The print setting reading unit 302 reads setting information of print settings incorporated in the print data D1 of the print job J1. In the present exemplary embodiment, a matrix two-dimensional code 400 of another page (the first page P1 in the present exemplary embodiment) is read as setting information of print settings incorporated in the print data D of the print job J1 (see FIG. 1).

The print setting deletion unit 303 deletes the print settings incorporated in the print data D of the print job J1. In the present exemplary embodiment, another page (the first page P1 in the present exemplary embodiment) in which the matrix two-dimensional code 400 incorporated in the print data D of the print job J1 is described is deleted.

The control unit 304 causes the image forming unit 36 to print the print data D1 while reflecting the setting information of the print settings read by the print setting reading unit 302. The print data D1 is the original print data not including the print settings.

Next, the operation of the image forming system will be described.

Figure 8:
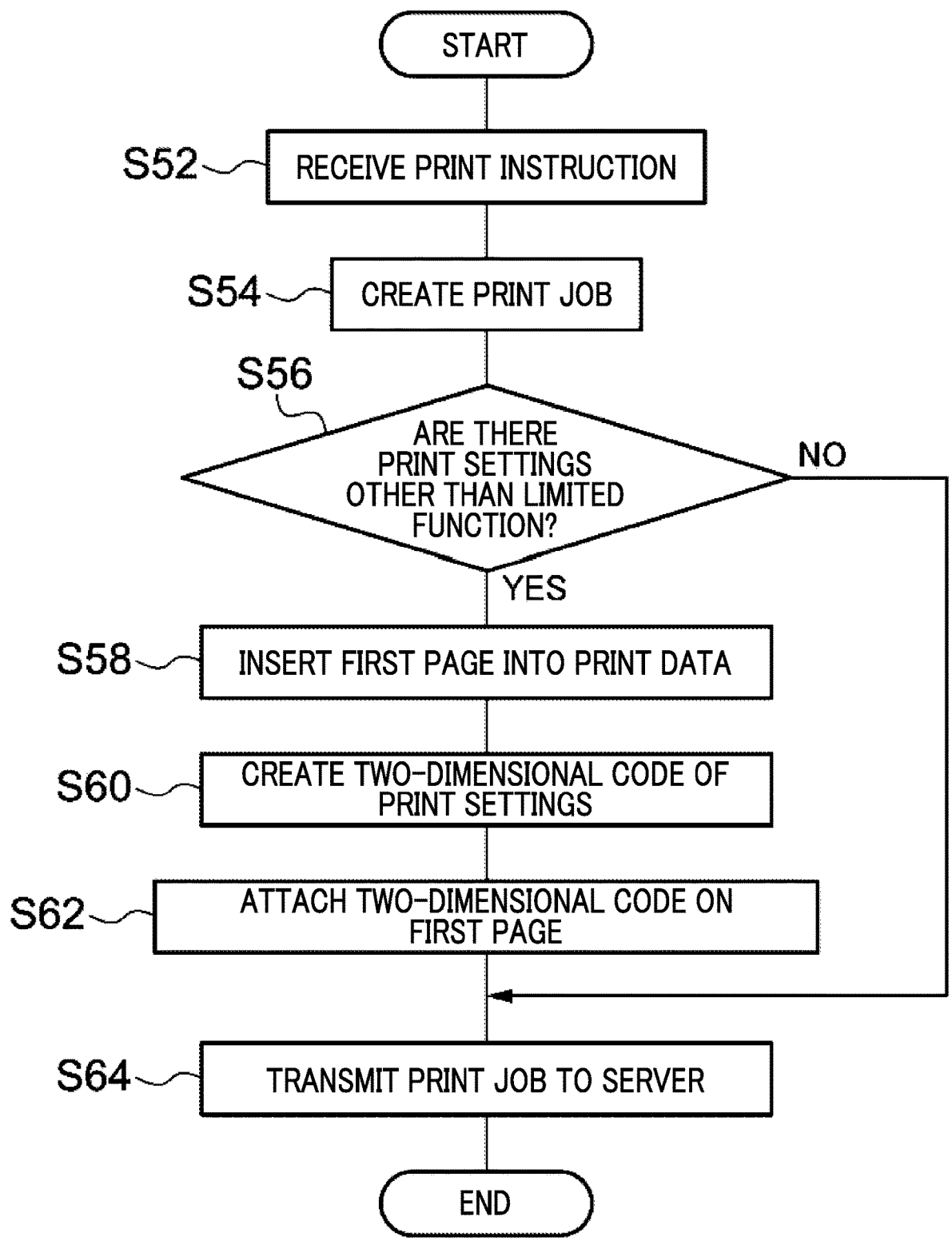
FIG. 8 is a flowchart showing a flow of processing of the user terminal.

FIG. 8 is a flowchart showing a flow of print setting addition processing by the user terminal 10 of the image forming system 1. The print setting addition processing is executed by the CPU 11 reading out the print setting addition program stored in the ROM 12 or the storage 14, and developing and executing the program in the RAM 13.

Before the print setting addition processing shown in FIG. 8 is executed, the user previously creates the print data D1 (see FIG. 1) at the user terminal 10. In a case where it is desired to print the print data D1 by the image forming apparatus 30 located away from the user terminal 10, the print setting addition processing shown in FIG. 8 is performed. The user designates the print data D1 to be printed using the input unit 15 of the user terminal 10, and inputs the print settings and print instruction for printing the print data D1.

In a case where the user inputs the designation of the print data D1, the print settings, and the print instruction, the CPU 11 receives the print instruction (step S52).

The CPU 11 creates a print job J1 for printing the print data D1 (step S54).

The CPU 11 determines whether or not the print instruction received in step S52 includes print settings other than the limited function (step S56). The "limited functions" are functions received by the server 20 and stored in the ROM 12 or the storage 14. Examples of print settings other than the limited functions include post-processing such as stapling, punching with a punch, authentication for permitting printing only to specific users, or color printing. In the present exemplary embodiment, the print settings other than the limited functions include authentication for permitting printing only to specific users, or color printing (see FIG. 1).

In a case where there is no print settings other than the limited function (NO in step S56), the CPU 11 proceeds to the process of step S64. In a case where there are print settings other than the limited function (YES in step S56), the CPU 11 inserts the first page (first page P1 shown in FIG. 1) into the print data D1 (step S58).

The CPU 11 creates a matrix two-dimensional code 400 as setting information indicating print settings other than the limited functions (step S60). For example, a QR code (registered trademark) is created as the matrix two-dimensional code 400. In the present exemplary embodiment, the matrix two-dimensional code 400 includes authentication 402 for permitting printing only to a specific user, and information on print settings indicating print settings for color printing (see FIG. 1). The matrix two-dimensional code 400 is executed by a two-dimensional code generation program which creates a matrix two-dimensional code stored in the ROM 12 or the storage 14.

The CPU 11 attaches the matrix two-dimensional code 400 on the first page (the first page P1 shown in FIG. 1) (step S62). Thus, the page P1 of the matrix two-dimensional code 400 is incorporated as part of the print data D.

The CPU 11 transmits, to the server 20, the print job J1 including the print data D in which the page P1 is incorporated (step S64). Thus, processing based on the print setting addition program is ended.

Next, print job receiving processing is performed by the server 20 of the image forming system 1. The print job receiving processing is executed by the CPU 21 of the server 20 reading out the print job receiving program from the ROM 22 or the storage 24, and developing and executing the program in the RAM 13.

Although not shown, the server 20 receives, from the user terminal 10, the print job J1 in which the page P1 of the matrix two-dimensional code 400 is incorporated as part of the print data D. Further, the server 20 transmits, to the image forming apparatus 30, the print job J1 in which the page P1 of the matrix two-dimensional code 400 is incorporated as part of the print data D.

Figure 9:
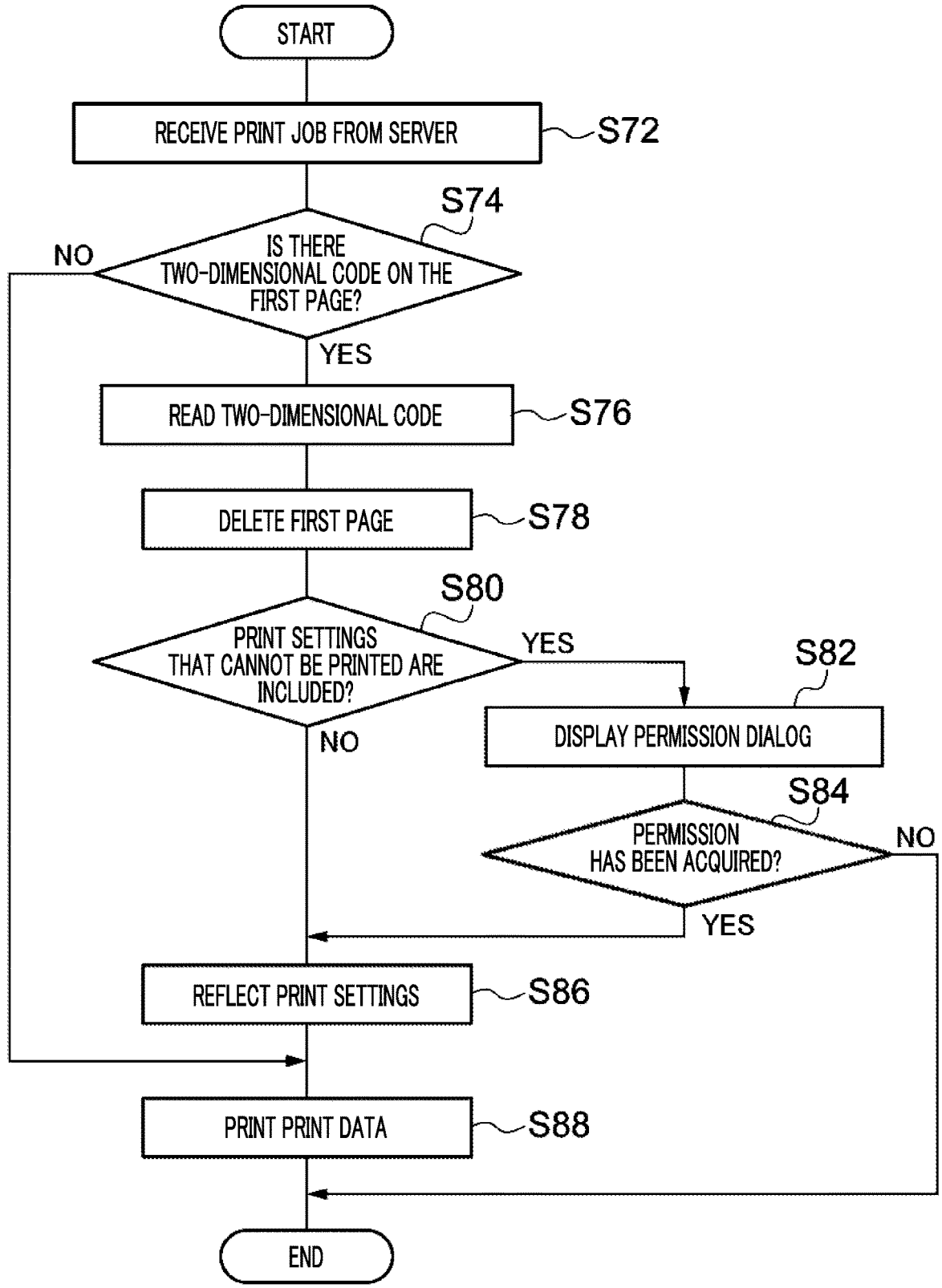
FIG. 9 is a flowchart illustrating a flow of an operation of the image forming apparatus.

FIG. 9 is a flowchart showing the flow of print setting reflection processing by the image forming apparatus 30 of the image forming system 1. The print setting reflection processing is executed by the CPU 31 reading out the print setting reflection program stored in the ROM 32 or the storage 34, and developing and executing the program in the RAM 33.

As shown in FIG. 9, the CPU 31 receives, from the server 20, the print job J1 in which the page P1 of the matrix two-dimensional code 400 is incorporated as part of the print data D (step S72).

The CPU 31 determines whether or not the matrix two-dimensional code 400 is present on the first page (first page P1 shown in FIG. 1) of the print job J1 (step S74).

In a case where there is no matrix two-dimensional code 400 (NO in step S74), the CPU 31 proceeds to the processing of step S88. In a case where there is a matrix two-dimensional code 400 (YES in step S74), the CPU 31 reads the matrix two-dimensional code 400 (step S76). The CPU 31 reads the matrix two-dimensional code 400 and specifies print settings for causing the image forming apparatus 30 to execute functions other than the limited functions. In the present exemplary embodiment, by reading the matrix two-dimensional code 400, authentication 402 for permitting printing only to specific users and color printing are specified as the "print settings other than the limited functions".

The CPU 31 deletes the first page (the first page P1 shown in FIG. 1) of the print data D of the print job J1 (step S78). Thus, the original print data D1 is obtained.

The CPU 31 determines whether or not the "print settings other than the limited functions" read in step S76 includes print settings that cannot be printed by the image forming apparatus 30 (step S80). In the present exemplary embodiment, there is color printing as print settings that cannot be printed by the image forming apparatus 30.

In a case where the print settings that cannot be printed by the image forming apparatus 30 is not included (NO in step S80), the CPU 31 proceeds to the processing of step S86. In a case where the print settings that cannot be printed by the image forming apparatus 30 is included (YES in step S80), the CPU 31 displays a permission dialog 150 shown in FIG. 10 on the display unit 35B (step S82).

Figure 10:
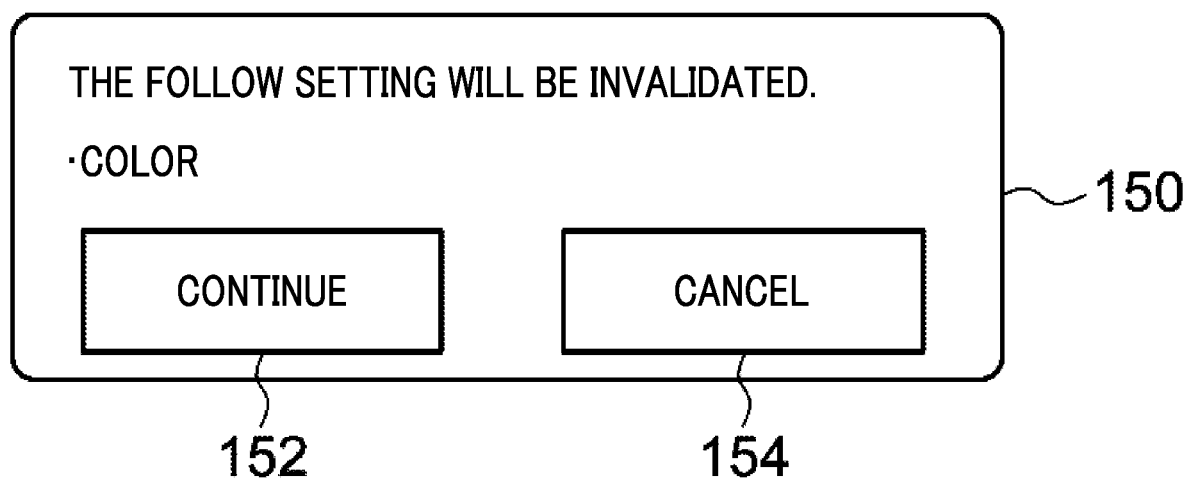
FIG. 10 is a diagram illustrating an example of a permission dialog displayed on the display unit of the image forming apparatus.

As shown in FIG. 10, the permission dialog 150 displays that the setting for color printing is invalidated, and also displays the touch panels of continuation 152 and cancellation 154. The user presses the touch panel of either continuation 152 or cancellation 154 to select the print instruction of either continuation 152 or cancellation 154.

As shown in FIG. 9, the CPU 31 determines whether or not the permission of the permission dialog 150 has been acquired (step S84). In the present exemplary embodiment, when the user presses the touch panel of the continuation 152 of the permission dialog 150 shown in FIG. 10, the CPU 31 determines that the permission has been acquired.

In a case where the permission is not acquired (NO in step S84), the CPU 31 ends the processing based on the print setting reflection program. In a case where the permission is not acquired, the CPU 31 may notify the user terminal 10 through the server 20 that printing cannot be performed. In a case where the permission is acquired (YES in step S84), the CPU 31 reflects the print settings on the print job J1 (step S86). In the present exemplary embodiment, the print settings include "print settings of limited functions" and "print settings other than limited functions". In the present exemplary embodiment, an authentication 402 for permitting printing to only a specific user is included as "print settings other than the limited functions", and color printing is invalidated.

The CPU 31 causes the image forming unit 36 to print the print data D1 on the recording medium P (see FIG. 1) (step S88). The print data D1 is the original print data not including the page P1 of the matrix two-dimensional code 400. Thus, processing based on the print setting reflection program is ended.

Although the image forming system 1 adds the matrix two-dimensional code 400 to the first page of the print data D1, the present disclosure is not limited to this, the matrix two-dimensional code 400 may be added to another page of the print data D1, or may be added to the page included in the original image data.

Second Exemplary Embodiment

Next, an image forming system according to a second exemplary embodiment will be described. The same constituent elements as in the first exemplary embodiment described above are denoted by the same reference numerals, and a description thereof will be omitted.

In the first exemplary embodiment, by adding the page P1 of the matrix two-dimensional code 400 to the print data D1, the information of "print settings other than the limited functions" is added to the print job J1. In the second exemplary embodiment, data of annotations is added to the print data D1, instead of the matrix two-dimensional code 400.

FIG. 11 is a flowchart showing the flow of print setting addition processing by the user terminal 10. The print setting addition processing is executed by the CPU 11 reading out the print setting addition program stored in the ROM 12 or the storage 14, and developing and executing the program in the RAM 13. The description of the flow of the same processing as in the first exemplary embodiment may be omitted.

In a case where the user inputs the designation of the print data D1, the print settings, and the print instruction, the CPU 11 receives the print instruction (step S162).

The CPU 11 creates a print job J1 for printing the print data D1 (step S164).

The CPU 11 determines whether or not the print instruction received in step S162 includes print settings other than the limited function (step S166).

In a case where there is no print settings other than the limited function (NO in step S166), the CPU 11 proceeds to the process of step S172. In a case where there are print settings other than the limited function (YES in step S166), the CPU 11 creates an annotation (that is, an annotation) as setting information indicating the print settings other than the limited function (step S168). In the present exemplary embodiment, the annotation is setting information indicating authentication 402 for permitting printing only to a specific user and color printing (see FIG. 1). The annotation is executed by an annotation creating program that creates an annotation of setting information indicating print settings stored in the ROM 12 or the storage 14.

The CPU 11 adds the annotation created in step S168 to the existing page of the document represented by the print data D1 (step S170). Thus, the annotation is incorporated as part of the print data D. In the present exemplary embodiment, the annotation is added in the non-printing area outside of the field of the print data D1. In addition, the annotation is added in a color different from the color of the recording medium P. The annotation may be described in the print area of the print data D1. Further, the annotation may be added in the same color as the color of the recording medium P in a case where it is readable by the image forming apparatus 30, or may be added to the white recording medium P in light color.

The CPU 11 transmits, to the server 20, the print job J1 in which the annotation is incorporated as part of the print data D (step S172). Thus, processing based on the print setting addition program is ended.

FIG. 12 is a flowchart illustrating the flow of the print setting reflection processing by the image forming apparatus 30. The print setting reflection processing is executed by the CPU 31 reading out the print setting reflection program stored in the ROM 32 or the storage 34, and developing and executing the program in the RAM 33.

As shown in FIG. 12, the CPU 31 receives from the server 20 the print job J1 in which the annotation is incorporated as part of the print data D (step S182).

The CPU 31 determines whether or not the print data D of the print job J1 has an annotation (step S184).

In a case where there is no annotation (NO in step S184), the CPU 31 proceeds to the processing of step S198. In a case where there is an annotation (YES in step S184), the CPU 31 reads the annotation (step S186). The CPU 31 specifies the "print settings other than the limited functions" by reading the annotation. In the present exemplary embodiment, authentication 402 for permitting printing only to specific users and color printing are specified as "print settings other than the limited functions".

The CPU 31 deletes the annotation in the print data D (step S188). Thus, the original print data D1 is obtained.

The CPU 31 determines whether or not the "print settings other than the limited functions" read in step S186 includes print settings that cannot be printed by the image forming apparatus 30 (step S190). In the present exemplary embodiment, there is color printing as print settings that cannot be printed by the image forming apparatus 30.

In a case where the print settings that cannot be printed by the image forming apparatus 30 is not included (NO in step S190), the CPU 31 proceeds to the processing of step S196. In a case where the print settings that cannot be printed by the image forming apparatus 30 is included (YES in step S190), the CPU 31 displays a permission dialog 150 shown in FIG. 10 on the display unit 35B (step S192).

The CPU 31 determines whether or not the permission of the permission dialog 150 has been acquired (step S194).

In a case where the permission is not acquired (NO in step S194), the CPU 31 ends the processing based on the print setting reflection program. In a case where the permission is acquired (YES in step S194), the CPU 31 reflects the print settings on the print job J1 (step S196).

The CPU 31 causes the image forming unit 36 to print the print data D1 on the recording medium P (see FIG. 1) (step S198). Thus, processing based on the print setting reflection program is ended.

The processing by the user terminal 10 and the image forming apparatus 30 described above can also be implemented by a dedicated hardware circuit. The processing may be executed by one piece of hardware or by plural pieces of hardware.

Further, the program for operating the user terminal 10 and the image forming apparatus 30 may be provided by a computer readable recording medium such as a universal serial bus (USB) memory, a flexible disk, and a compact disk read only memory (CD-ROM), or may be provided online through a network such as the Internet. In this case, the program recorded on the computer readable recording medium is usually transferred to and stored in a memory, a storage or the like. Further, this program may be provided, for example, as single application software, or may be incorporated into the software of each device as one function of the user terminal 10 and the image forming apparatus 30.

In the first and second exemplary embodiments, the permission dialog 150 is displayed in a case where non-printing setting in which the image forming apparatus 30 is not able to perform printing is included, but the content of the permission dialog can be changed. For example, a permission dialog for changing the non-printing setting to the initial value (that is, the default value) may be displayed, and in a case where the permission is acquired, the print data may be printed. Further, the print data may be printed by changing the non-printing setting to the initial value without displaying the permission dialog.

Further, although the number of image forming apparatuses 30 is one in the first and second exemplary embodiments, the present disclosure is also applicable to an image forming system in which one of plural image forming apparatuses is selected.

The same can be applied in a case where the universal printer driver is installed in the user terminal 10. That is, since the universal printer driver is a printer driver that can be commonly used by various image forming apparatuses, it is limited to print settings that can be instructed by this printer driver. Even in such a case, by incorporating a matrix two-dimensional code or an annotation as setting information indicating print settings as part of print data, it is possible to transmit to the image forming apparatus, print settings including the limited functions or more.

Further, in the first and second exemplary embodiments, the server 20 that performs a service using a cloud is used, but the present disclosure is not limited thereto. For example, a relay unit other than the service using the cloud may relay the print job J1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a processor programmed to
receive a print job including print data that indicates an image to be formed, setting information being incorporated as part of the image to be formed, the setting information indicating print settings for printing the print data; and
control printing according to the print settings indicated by the setting information incorporated in the print data of the print job.

2. The image forming apparatus according to claim 1, wherein
the setting information is a matrix two-dimensional code.

3. The image forming apparatus according to claim 2, wherein
the two-dimensional code is added to another page added to a document represented by the print data.

4. The image forming apparatus according to claim 3, wherein
the processor is programmed to delete the other page after reading the setting information.

5. The image forming apparatus according to claim 4, wherein
the processor is programmed to cause the print data to print after deleting the other page.

6. The image forming apparatus according to claim 1, wherein
the setting information is added as an annotation to an existing page of a document represented by the print data.

7. The image forming apparatus according to claim 6, wherein
the processor is programmed to delete the annotation after reading the setting information.

8. The image forming apparatus according to claim 7, wherein
the processor is programmed to cause the print data to print after deleting the annotation.

9. A non-transitory computer readable medium storing a program causing a computer to execute a process comprising:
receiving a print job including print data that indicates an image to be formed, setting information being incorporated as part of the image to be formed, the setting information indicating print settings for printing the print data, and
causing printing to be performed according to the print settings indicated by the setting information incorporated in the print data of the print job.

10. An image forming system comprising:
the image forming apparatus according claim 1;
a server that accepts a print job instructing functions that are more limited than functions executable by the image forming apparatus, and does not accept a print job instructing functions other than the limited functions; and
a user terminal that receives print settings for printing print data, and causes the server to accept a print job in which print settings for causing the image forming apparatus to execute functions other than the limited functions are incorporated as part of the print data.

11. An image forming apparatus comprising:
a processor programmed to
receive a print job including print data that indicates an image to be formed, setting information being incorporated as part of the image to be formed, the setting information indicating print settings for printing the print data; and
control printing of the print job according to the print settings indicated by the setting information incorporated in the print data of the print job without printing the setting information, wherein
the setting information is a matrix two-dimensional code.

* * * * *